United States Patent [19]

Zientek

[11] Patent Number: 4,676,919

[45] Date of Patent: Jun. 30, 1987

[54] LOW PH-BUFFERED SILICON/SILICATE ANTIFREEZE CONCENTRATES

[75] Inventor: Eugene A. Zientek, Thornwood, N.Y.

[73] Assignee: First Brands Corporation, Danbury, Conn.

[21] Appl. No.: 752,561

[22] Filed: Jul. 10, 1985

Related U.S. Application Data

[63] Continuation-in-part of Ser. No. 633,208, Jul. 23, 1984, abandoned.

[51] Int. Cl.$^4$ ............................................. C09K 5/00
[52] U.S. Cl. ..................................... 252/75; 252/78.3; 252/389.31; 556/405; 556/410
[58] Field of Search .............................. 252/75, 78.3

[56] References Cited

U.S. PATENT DOCUMENTS

| | | | |
|---|---|---|---|
| 3,337,496 | 8/1967 | Pines et al. | 260/46.5 |
| 3,341,469 | 9/1967 | Pines et al. | 252/389 |
| 4,149,985 | 4/1979 | Wilson | 252/74 |
| 4,333,843 | 6/1982 | Wing et al. | 252/78.3 |
| 4,460,478 | 7/1984 | Mohr et al. | 252/75 |
| 4,462,921 | 7/1984 | Peterson et al. | 252/75 |

*Primary Examiner*—Robert A. Wax
*Attorney, Agent, or Firm*—Gary L. Wamer

[57] ABSTRACT

A buffer and silicone/silicate-containing antifreeze concentrate characterized by storage stability and minimized corrosiveness toward metals when diluted to make an antifreeze.

21 Claims, No Drawings

LOW PH-BUFFERED SILICON/SILICATE ANTIFREEZE CONCENTRATES

This is a continuation-in-part of application Ser. No. 633,208, filed July 23, 1984, now abandoned.

FIELD OF THE INVENTION

The present invention relates generally to an antifreeze composition concentrate and, more specifically, to an antifreeze concentrate having a pH of between about 5.8 and about 7.5.

BACKGROUND OF THE INVENTION

Corrosion-inhibitive heat transfer compositions of aqueous alcohol solutions heretofore have widely been employed in heat exchange systems associated with internal combustion engines, solar systems, and the like, to depress the freezing point of the coolant, to raise its boiling point, and provide corrosion protection. Conventional alcohol-based heat transfer fluids, such as automobile antifreezes, have the tendency to corrode the metal (e.g., aluminum, copper, iron, brass and solder) surfaces of the heat transfer system.

There are unique corrosion problems associated with the recent trend to the greater usage of aluminum in internal combustion engine cooling systems. The state-of-the-art antifreeze cooling compositions previously used in such systems have been formulated for use in cooling systems constructed largely of cast iron, employing corrosion inhibitors and parameters calculated to minimize corrosion on ferrous metal surfaces.

Tests designed to simulate the corrosion that would result upon the aluminum structural parts of the cooling system demonstrate that state-of-the-art antifreezes can fail to provide adequate corrosion protection. Indeed, and conceptually, the expected failure can be catastrophic, e.g., such as would result from pinholes in an aluminum radiator.

In automobile cooling systems, any aluminum corrosion that occurs not only damages the aluminum metal surface being attacked by corrosion, but can also adversely affect other parts of the cooling system due to a phenomenon called "transport deposition". By virtue of transport deposition, soluble aluminum corrosion products formed at hot engine surfaces are carried to and precipitated on the cooler radiator tubes, where they form heat-insulating films or coatings that impair heat-transfer.

Two United States patents are particularly noteworthy, as these are considered to be representative of the state-of-the-art antifreeze technology. U.S. Pat. Nos. 3,341,469 and 3,337,496 thus disclose an aqueous alcohol composition employing organosiloxane/silicate copolymers which comprises:

an alcohol;
an organosiloxan/silicate copolymer present in an amount of from 0.01 percent to 10 percent by weight based upon the weight of said concentrate and consisting essentially of:
(1) from 0.1 to 99.9 parts by weight of at least one member selected from the group consisting of (a) siloxane groups represented by the formula:

$$RSiO_{1.5}$$

wherein R is a member selected from the group consisting of the methyl, ethyl, phenyl and vinyl groups and (b) siloxane groups represented by the formula:

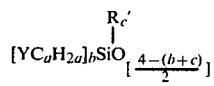

wherein Y is a member selected from the group consisting of the cyano group, $CH_2(OH)CH(OH)$ group, $CH_2(OH)CH(OH)CH_2$ group,

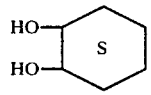

group, $CH_2(OH)CH(OH)CH_2O$ group and $R''(OCH_2CH_2)_n(OC_3H_6)_mO$ group, wherein $R''$ is a member selected from the group consisting of the monovalent hydrocarbons and the hydrogen atom, n and m are integers and n has a value of at least 1, m has a value from 0 to 20 inclusive, the ratio of n to m is at least 2 to 1, a is an integer and has a value of at least 2, $C_aH_{2a}$ is an alkylene group, the group represented by Y is separated from the silicon atom by at least two successive carbon atoms, b is an integer and has a value of from 1 to 3 inclusive, $R'$ is a monovalent hydrocarbon group, c is an integer and has a value from 0 to 2 inclusive, (b+c) has a value from 1 to 3 inclusive; and
(2) from 0.1 to 99.9 parts by weight of at least one silicate group represented by the formula:

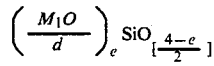

wherein M is a cation that forms a water soluble silicate, d is the valence of the cation represented by M and has a value of at least 1 and e has a value from 1 to 3 inclusive, said parts by weight of said groups in the copolymer being based on 100 parts by weight of the copolymer.

Corrosion-inhibitive heat transfer compositions of the type described in the '469 and '496 patents have enjoyed wide usage. A composition of this type typically has superior shelf-life, does not attack rubber parts in cooling systems, is characterized by low levels of foam formation, and is useful over a wide temperature range even after prolonged periods in service. This has provided an antifreeze which, while subject to annoying gelation problems and the like from time to time, has reasonable latitude in preparation and use. Adequate amounts of silicate can be stabilized against gelation by a wide variety of silicones. This is demonstrated by many patents in this field, setting forth a wide variety of silicones considered to be useful.

A commercial antifreeze concentrate within the scope of these patents, phosphate/borate buffered, has a pH of about 10.5 to insure silicate stability. Unfortunately, it has been found that this high pH and the alkali metal phosphate content of the antifreeze can promote transport-deposition of aluminum corrosion products in the radiator. These corrosion products result from cavitation-erosion-corrosion (CEC) at nucleate boiling sites on aluminum, especially when the silicate in the antifreeze becomes depleted.

The high pH of the antifreeze previously referred to is believed to be typical of that utilized by the prior art for antifreezes of this type. The prior art thus urges the requirement of a relatively high pH to prevent the development of silicate gels. U.S. Pat. No. 4,149,985 teaches that the pH at the time of silicate addition to such antifreeze concentrates must be between 9.5 and 10.5 (providing a final concentrate pH of about 11) in order to minimize concentrate stability problems during storage.

For these reasons, a need has developed for an antifreeze capable of providing adequate protection against aluminum and other cooling system metal corrosion and which does not gel in concentrate form. It is believed that this need is becoming more acute, triggered by the desire of many in the industry to have available an antifreeze with such capabilities.

Low pH (below 7.5) silicate-containing antifreeze concentrates have not been used commercially to the knowledge of the present inventor. It is speculated that one reason for this absence may be that the low pH environment would be considered to cause silicate stability problems in the concentrate due to the tendency of silicates to form insoluble gels in this environment, as is expressed in U.S. Pat. No. 4,149,985, previously discussed. A further reason may be the belief that utilizing a relatively low pH may reduce silicate corrosion inhibitor effectiveness since silicates have an inherently lower solubility in this low pH environment. A still further technical reason that low pH antifreezes have not been developed heretofore is the belief that they would be inherently more corrosive toward non-amphoteric metals, such as iron.

OBJECTS OF THE INVENTION

It is an object of the present invention to provide a relatively low pH antifreeze concentrate characterized by acceptable storage stability and, when diluted to make an antifreeze, providing minimized corrosiveness toward aluminum in comparison to state-of-the-art antifreezes, particularly in regard to cavitation-erosion-corrosion and the related transparent deposition of aluminum.

A related and more specific object is to provide an antifreeze having not only high resistance against aluminum corrosion but also having acceptable corrosion resistance for other metal surfaces when used in other than totally aluminum cooling systems.

These and other objects will become apparent by the reading of the following detailed specification.

SUMMARY OF THE INVENTION

The present invention relates to an antifreeze composition concentrate comprising:
(i) alcohol;
(ii) a corrosion inhibiting amount of an organosiloxane/silicate polymer, that is soluble and stable against gelation in the antifreeze composition concentrate, and that contains, as its essential components, from 0.1 to 99.9 parts by weight of A and from 0.1 to 99.9 parts by weight of B or C, or mixtures of B and C, wherein the individual components of the polymer are defined as follows:
(A) is the lyophyllic, solubilizing and gel-retarding, organofunctionally-modified siloxane portion of the polymer and is defined as a distribution of species represented by the empirical formula:

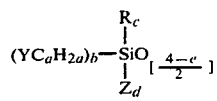

where Y represents a lyophyllic organofunctional moiety selected from the group consisting of polyethyleneoxy containing species, hydroxy containing species, saponified carboxy containing species, saponified phosphate or phosphonate ester containing species, saponified sulfonate containing species, or mixtures thereof; wherein a is an integer having a value from 1 to 20 inclusive, b is an integer having a value from 1 to 3 inclusive, c is an integer having a value from 0 to 2 inclusive, d is an integer having a value from 0 to 3 inclusive and e is an integer having a value from 1 to 4 inclusive, the value of e being equal to the sum of b, c and d, R is a monovalent hydrocarbon radical free of olefinic unsaturation, Z represents a hydrolyzable moiety attached to silicon consisting of at least one member selected from the group consisting of OR' and NR'$_2$, wherein R' may be the same or different species selected from the group consisting of hydrogen, monovalent hydrocarbon radicals, and substituted monovalent hydrocarbon radicals (including, for example, acyl containing species, alkyl containing species, aryl containing species, aralkyl containing species, alkaryl containing species, alkylene containing species, hydroxy alkyl containing species, hydroxy polyalkyleneoxy alkyl containing species, alkoxy polyalkyleneoxy alkyl containing species, acyloxy polyalkyleneoxy alkyl containing species, alkoxy alkyl containing species, acyloxy alkyl containing species, cyano alkyl containing species, cyano polyalkyleneoxy alkyl containing species, amino alkyl containing species, alkylamino alkyl containing species, dialkylamino alkyl containing species, alkanolamino alkyl containing species, dialkanolamino alkyl containing species, carboxy alkyl containing species, carboxy polyalkyleneoxy alkyl containing species, carboalkoxy containing species and carboalkoxy alkyl containing species); said siloxane portion being present in an amount sufficient to solubilize and stabilize against gelation said organosiloxane/silicate polymer, (B) is an inorganic silicate portion described as a distribution of species represented by the empirical formula:

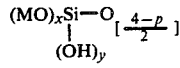

where M is a monovalent cation that forms a glycol soluble silicate selected from the group consisting of sodium, potassium, lithium, rubidium and tetraorganoammonium cations and where x has a value of from 1 to 4 inclusive, y has a value from 0 to 3 inclusive and p has a value from 1 to 4 inclusive which is equal to the sum of x and y; and (C) is an organic silicate ester encompassed by the formula:

$$Si(OR)_4$$

wherein R is selected from the group consisting of alkyl, aryl, alkoxyalkyl, alkoxyaryl and mixtures thereof, (iii) a buffer selected from the group consisting of ammonium borate, alkanolamine and alkali metal borate, tetraalkyl and tetraaryl-ammonium borates and borate mixtures thereof; ammonium phosphate, alkanolamine phosphates, and tetraalkyl- and tetraaryl-ammonium phosphates, and phosphate mixtures thereof; alkali metal, ammonium, and amine, benzoates, substituted benzoates; salts of the dibasic acids, such as sebacic and azelaic acids, having 6 to 20 carbons, and mixtures thereof; and mixtures of any of the above buffers; said buffer being present in an amount of between about 1 and about 5 wt. percent, based on the weight of the concentrate; to yield a reserve alkalinity from about 10 to 75; and having a pH range in the concentrate of 5.8 to about 7.5, with the proviso that essentially no alkali metal phosphate is present.

Optional siloxanes can also be present in the organosiloxane/silicate polymer in the antifreeze concentrate such as those represented by (D) and (E) wherein:

(D) is a lyophobic, organofunctionally-modified siloxane portion described as a distribution of species represented by the empirical formula:

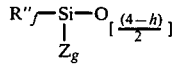

where R" is a monovalent hydrocarbon radical, Z has the meaning defined in (A) above, f is an integer having a value from 1 to 3 inclusive, g has a value from 0 to 3 inclusive, h has a value from 1 to 4 inclusive which is equal to the sum of f and g.

(E) is a lyophobic, organofunctionally-modified siloxane portion described as a distribution of species represented by the empirical formula:

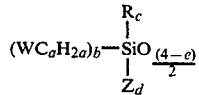

where W represents an organofunctional moiety which alters the inhibitor performance characteristics of the total polymer and is selected from the group consisting of acyl containing species, acyloxy containing species, acyloxyalkaleneoxy containing species, alkylamino containing species, arylamino containing species, alkylarylamino containing species, alkoxyalkyleneoxy containing species, epoxycycloalkyl containing species, furfuryloxy containing species, halogen containing species, imidazolino containing species, imino containing species, unsaponified organophosphate ester containing species, pyridino containing species, tetrahydrofurfuryloxy containing species, trialkoxymethyl containing species, trialkoxymethyl containing species, trialkoxysilyl containing species, trialkylsilyl containing species, trialkanolammonium containing species, trialkylammonium containing species, the free acid or unsaponified carbalkoxyalkylamino containing species, and the free acid or unsaponified carboalkoxyalkylsulfonate; a is an integer having a value of 1 to 20 inclusive, b is an integer having a value of 1 to 3 inclusive, c is an integer having a value of from 0 to 2, d is an integer having a value from 0 to 3 and e is an integer having a value from 1 to 4 inclusive, the value of e being equal to the sum of b, c and d; R is a monovalent hydrocarbon value free of olefinic unsaturation and Z has the meaning defined in (A) above.

The perceived function of these optional siloxanes will be discussed more fully in the ensuing detailed description of the present invention. However, in general, it is believed that the inclusion of such optional siloxanes may provide, in some instances, improved corrosion inhibition performance for the antifreeze.

In another aspect, the present invention relates to a method of using the antifreeze concentrate described above which comprises, without regard to sequence, the steps of:

(a) diluting the concentrate with water or a mixture of water and alcohol to produce a working antifreeze, and (b) adding the working antifreeze to an automobile engine cooling system.

In yet another aspect, the present invention relates to an antifreeze composition comprising the above concentrate and additionally containing water or alcohol, or mixtures thereof.

DETAILED DESCRIPTION OF THE INVENTION

The organosiloxane/silicate polymers that are useful in the practice of this invention are uniquely soluble in ethylene glycol or other alcohol employed in a pH range of 5.8 to 7.5, at concentrations that provide protection against metal corrosion, particularly to aluminum, when their ethylene glycol solutions are diluted with water. The polymers do not gel in the antifreeze concentrate upon prolonged standing at the ambient storage temperatures that are encountered during production and distribution of antifreeze as suitably tested by storing the concentrate for six months at 150° F. The term "soluble", as used herein with respect to the organosiloxane/silicate polymers, describes a characteristic of the individual polymer whereby it is in microdispersed, microcolloidal or solution form in the antifreeze composition concentrate. As used herein, the term "stable against gelation", as used in discussing the polymers, refers to a characteristic of the polymer whereby the polymer provides no visible gels or solids accumulation, in the complete antifreeze composition concentrate upon storage of the concentrate for at least six months at 150° F. In other words, upon storage of the antifreeze concentrate for six months at 150° F., no gel phase appears. Regardless of the specific physical form (viz.-microdispersed, microcolloidal, solution, or the like), the antifreeze concentrates of this invention function as a one-phase liquid system.

The organosiloxane/silicate polymers utilized in the present invention are complex reaction products of various organofunctional silanes and organic or inorganic silicates, balanced in specie and quantity, to achieve silicate solubility of acceptable levels while imparting freedom from gelation in the alcohol employed, typically, ethylene glycol, having a pH of from 5.8 to 7.5, provided by a buffer such as, for example, a borate. In use in aqueous antifreeze solutions, such polymers provide, via hydrolysis reactions, a supply of inhibitory silicate species that provides corrosion protection.

The organosiloxane/silicate polymers useful in the present invention can be considered to be a reaction product of at least (A) together with (B) and/or (C), as essential ingredients together with the possible addition of optional additives such as (D) and/or (E). These components are identified above as representing a polymer of siloxanes and organic and/or inorganic silicates. The organosiloxane portions are derived from organosilanes.

Component (A) is characterized as an appropriately lyophillic organosiloxane that solubilizes, and retards gel formation of the total polymer in its alcohol environment and as used herein, the term "solubilizes" or "solubilizing" is intended to define the function of component (A) in its role of maintaining the total polymer with all siloxane and silicate components in soluble form in the antifreeze concentrate. Also as used herein, the term "gel-retarding" or "retard gels" refers to the function of component (A) in its role of preventing any visually observable or apparent gel formation in the antifreeze concentrate. Since component (A), via its lyophillicity, imparts stability against gelation to the total polymer molecule, when preparing the polymer in situ in the complete antifreeze, Component (A) should preferably be added to the alcohol base fluid of the antifreeze first before adding the other polymer components.

In addition, Component (A) must possess an adequate degree of lyophillicity so that, when the polymer in its ethylene glycol environment is diluted in water, it hydrolyzes to yield the metal corrosion inhibiting moieties which are, in turn, the hydrolysis products of the remaining polymer components (B) and (C), and when used, the other polymer components such as (D) and/or (E). For sake of simplicity, the terminology "lyophillic" is used herein to describe the requisite characteristics of component (A) imparted to the polymer. By this terminology, it is intended to describe the character of the polymer which allows it to be soluble, and free from gelation, in both the alcohol-based antifreeze concentrate as well as the aqueous working antifreeze.

In the many prior patents in this field, e.g., U.S. Pat. Nos. 3,341,469; 3,337,496, 4,149,985 referred to above, it is suggested that an extremely large number of silanes are useful to form stable polymers with inorganic silicates which, in ethylene glycol concentrates, are not subject to gelation and the manufacturing and dispensing problems associated with gel formation. These prior patents likewise suggest that the pH range may vary widely, typical ranges being from 7.0 up to 12.0 or so. Prior work in this field also suggests that relatively large amounts of silicates (as much as 5,000 ppm of Si) can be appropriately stabilized. As far as it is known, applicant believes that these prior art teachings are based solely on experiments with relatively high pH concentrates (at a pH of at least 9.0).

In accordance with a principal aspect of the low pH antifreeze concentrate of the present invention, it has been discovered that appropriate lyophillicity may be imparted to the total polymer only by careful selection of component (A) in relation to the remainder of the components forming the total polymer utilized in the present invention.

Thus, pursuant to the present invention, it has been found that these prior art suggestions, based as they are on using relatively high pH systems, are not useful in predicting suitability of silanes for stabilizing silicate in the low pH systems of this invention. Numerous silanes suggested in the prior art are thus entirely inappropriate, as are the relatively large amounts of silicate (often reported as ppm of Si).

Indeed, it has been found that the low pH systems of this invention are more sensitive in terms of silicate stabilization capacity. Careful selection of the components is accordingly required to insure that a stable antifreeze concentrate is provided.

The selection of component (A) must thus be made in view of the other components present. As a general matter, component (A) may be viewed in a conceptual sense as having two parts, each having a defined and separate function which combines to yield the stable system.

One part of component (A) possesses an affinity for the silicate in the system, which silicate may be viewed as being present in particulate form. To stabilize such silicate against gelation, association with such silicate particles must be provided.

The other part of the component (A) molecule, viz.—the $(YC_aH_{2a})_b$ moiety in the empirical formula previously set forth, is viewed as imparting to the total polymer the requisite lyophillicity. The nature of this moiety must take into account the amount and type of the other components present.

Appropriate lyophillicity in this invention means, as previously noted, that the total polymer is soluble in the antifreeze concentrate and in the working antifreeze. At the same time, lyophillicity should not be provided to the degree that association with the silicate is impaired, such that undue gelation results.

Accordingly, and pursuant to this invention, it has been found that suitable systems may be provided when Y is an organofunctional moiety selected from polyethyleneoxy containing specie, hydroxy containing specie, saponified carboxy containing specie, saponified phosphate or phosphonate containing specie, saponified sulfonate containing specie, or mixtures thereof.

The particular $C_aH_{2a}$ moiety of component (A) selected will be determined in part, by the Y moiety being utilized. For example, when Y is a polyethyleneoxy containing specie, it will generally be more desirable to select the $C_aH_{2a}$ moiety such that a will be from 2 to 4. The difficulty of synthesis may also become a factor. In this regard, the selection of a as 3 is considered more facile from a synthesis standpoint.

On the other hand, when Y is an anionic species, such as a saponified carboxy containing species, it will generally be more appropriate to provide a larger $C_aH_{2a}$ moiety. This will tend to reduce the overall lyophillicity of component (A). It should, of course, be appreciated, as previously noted, that the particular selection must take into account the other components present.

The operability of a particular system, in any event, can be determined by testing the stability of the antifreeze concentrate against gelation. Example 1 sets forth suitable stability tests.

The preferred silanes for use in forming component (A) are:

$CH_3O(CH_2CH_2O)_7C_3H_6Si(OCH_3)_3$ (a)

$CH_3O(CH_2CH_2O)_{11}C_3H_6Si(OCH_3)_3$ (b)

Saponified $(CH_3)(O)(OCH_3)POC_3H_6Si(OCH_3)_3$ (c)

Saponified $CH_3OOC(CH_2)_{10}Si(OCH_3)_3$ and (d)

Saponified $(CH_3O)_2(O)PCH_2CH_2Si(OCH_3)_3$ (e)

The amount of component (A) that should be employed may vary widely. In a functional sense, the amount employed should be adequate to provide the desired solubility of the total polymer and freedom from gelation. Economics, of course, also plays an important role since the silanes tend to be more expensive than other components in the system. As an illustrative example, it will be generally useful to employ amounts of (A) in a range equivalent to about 20 to about 150 ppm of Si, based upon the total weight of the antifreeze concentrate, more preferably between about 40 and about 130 ppm. Below 20 ppm, the amount of component (A) is expected to be generally insufficient to stabilize the silicate present in an antifreeze concentrate.

Component (B) of the total organosiloxane/silicate polymer is the silicate portion of the molecule derived from certain inorganic silicates, such as, for example, sodium or potassium silicate. Reaction with component (A) overcomes its tendency to gel in ethylene glycol upon prolonged standing. When diluted with water, and its subsequent hydrolysis, this component yields the principal inhibitor moiety of the system. The quantity that may be employed is governed by the amount that is required for inhibition of metal corrosion in the automobile cooling system, as present in the total antifreeze concentrate, and the relative efficacy of component (A), in its function as a stabilizer moiety. The maximum amount employed will likewise be dictated by the solubility limit of the component at the pH of the system.

Experiments have revealed, in sharp contrast to prior high pH (i.e. at least 9 in the concentrate form) systems, that when the source of the silicate is an inorganic silicate of component (B), a silicate concentration equivalent to about 700 ppm Si is essentially the maximum quantity of silicate that can be stabilized against gelation by any lyophillic component (A) in the antifreeze concentrates of the present invention. Somewhat increased amounts may be suitable, but may require an economically inappropriate amount of component (A).

Component (C), when employed, is a portion of the polymer derived from a class of orthosilicate esters such as, for example, tetraethylorthosilicate. Once incorporated into the polymer, this component acts similarly to component (B). However, in use, when diluted with water, it is believed that such esters will form smaller silicate aggregates, which in turn have a greater proficiency in inhibition of metal corrosion.

As illustrative examples of useful materials for component (B), potassium and sodium silicates are appropriate. Useful materials for component (C) include the following orthosilicate esters: alkyl silicates such as methyl silicate, ethyl silicate, butyl silicate and amylsilicates; aryl silicates such as benzyl and tolyl silicates; mixed alkyl silicates such as methyl ethyl silicate; mixed aryl silicates such as benzyl tolyl silicate; mixed alkyl aryl silicates such as methyl benzyl silicate and ethyl tolyl silicate; glycol silicates such as hydroxyethyl glycol silicate and hydroxypropyl glycol silicate; and polyhydroxy alcohol silicates such as glycerol silicate and pentaerythritol silicate; oxyalkylene silicates such as methoxy diethylene glycol silicate, i.e. METHYL CARBITOL ® silicate; and mixtures of the above. Also useful within the scope of the present invention is the well-known class of partially condensed orthosilicate esters.

The amount of silicate in the concentrates of this invention, derived from components (B) and (C), can vary over a wide range, as has been discussed, but is preferably present in an amount of between 100 and 700 ppm of equivalent Si, more preferably in an amount between 300 and 500 ppm. Below 100 ppm, insufficient silicate would generally be provided to minimize metal corrosion inhibition in the automobile cooling system, whereas above 700 ppm, silicate gels may be encountered in the antifreeze concentrate.

Component (D) is an optional organosiloxane portion of the total polymer characterized by its relative lyophobicity (i.e. its lack of solubility in the antifreeze) in relation to that of component (A) and its resultant greater affinity for hydrolyzable silicate in aqueous solutions. As set forth in the summary of this invention, this component comprises a monovalent hydrocarbon group attached to silicon. In the total polymer, this component contributes to lyophobicity, thus necessitating, when used, a counter-balancing increased quantity of component (A). Upon dilution with water and the resultant hydrolysis of the total polymer it is believed that component (D) may act as a metal corrosion inhibitor per se or, in concert with components (B) and (C), may serve to desirably modify the silicate protective film structures that result from use of the antifreeze concentrates of this invention in an automobile cooling system.

Component (E) is also an optional organosiloxane portion of the total polymer. It is considered to provide a function similar to that of component (D); but, because of the presence of functional groups in its monovalent carbon chain, it should present greater flexibility in altering component (B) and/or (C) behavior after hydrolysis.

In accordance with the present invention, the siloxane portion of the polymer can contain, for example, polyethylenoxy containing species from (A) together with acyloxy containing species from (E) as long as sufficient (A) species is present to stabilize the amount of silicate (B) and/or (C), together with the added (E), present in the concentrate. As will be readily apparent, the amount of siloxane required will be a function of several factors:

(1) The particular mix of siloxane species of (A) and any (D) and/or (E) present, (2) The nature of the particular siloxanes themselves, and (3) The nature and amount of the silicate moiety to be stabilized by the siloxane. In this regard, it is expected that the silicates of (C) will be generally easier to stabilize than the silicates of (B).

The total siloxane portion of the siloxane/silicate polymer is preferably employed in an amount equivalent to that specified for component (A) above, namely between 20 and about 150 ppm of silicon equivalents, based on the weight of the antifreeze concentrate, more preferably between about 40 and about 130 ppm. However, the amount may be varied as desired, consistent with the desired economics and performance requirements.

The siloxane/silicate polymers useful in the composition of this invention are preferably employed in an amount of from about 0.01% to about 10% by weight, based upon the weight of the concentrate, more preferably from about 0.05 weight percent to about 5 weight percent, most preferably from about 0.05 weight percent to about 3 weight percent, based on the weight of the concentrate. Below about 0.01 wt.%, the amount of siloxane/silicate is expected to be insufficient to be functionally protective to metals, whereas above about 10 wt.% the cost of the siloxane/silicate becomes excessive.

The polymers useful in the present invention can be pre-formed prior to formulation of the antifreeze or they can be formed in situ in the antifreeze formulation by mixing organosilanes with silicates in the presence of the alcohol being employed. Suitable processes are well-known in the art and are disclosed, for example, in U.S. Pat. Nos. 3,337,496 and 3,312,622, both incorporated herein by reference.

The above-described corrosion-inhibitive heat transfer concentrate may contain a limited amount of water, e.g. about 0.1% to about 10% by weight of water, for example based upon the weight of the concentrate. This water may be inherent in the commercial grade alcohol typically used in the preparation of the antifreeze. Such aqueous concentrate may thereafter in use be further diluted by addition of from about 25% to about 90% by weight of water based upon the weight of the concentrate, to form a corrosion-inhibitive heat transfer composition suitable for introduction into automotive internal combustion engine cooling systems.

Suitable alcohols for use in the present invention include methanol, ethanol, propanol, butanol, ethylene glycol, diethylene glycol, propylene glycol, dipropylene glycol, glycerol, butylene glycol, the monoethylether of glycerol, the dimethyl ether of glycerol, alkoxy alkanols (such as methoxyethanol), and mixtures thereof. The preferred alcohol is selected from the group consisting of ethylene glycol, diethylene glycol, propylene glycol, dipropylene glycol and mixtures thereof.

Among the useful buffers identified in the summary of this invention, a borate is the preferred buffer and may be conveniently added as the alkali metal, ammonium or amine salt. After adding the salt, addition of sodium hydroxide or a mixture of boric acid and sodium hydroxide can be used to provide the desired metaborates and/or tetraborates in the concentrate. The buffer provides the desired use pH and capacity for maintaining this pH during extended use of this antifreeze when the pH would otherwise change due to changes in the constituents of the antifreeze over time. These functions are also achieved using soluble phosphate salts of non-alkali metals such as ammonium phosphate and alkanolamine phosphate and the other organic acid derivatives mentioned above. However, these amine phosphates are less preferred than the alkali metal borates since they promote the corrosion of cuprous metals.

The concentrates of the present invention contain "essentially no" alkali metal phosphate, which is intended to mean that the amount of alkali metal phosphate in the concentrate be less than 1000 ppm, preferably less than 500 ppm, more preferably less than 100 ppm based on the total weight of the concentrate. As previously noted, alkali metal phosphates create aluminum phosphate transport deposition problems in the cooling system during use. Low levels of these phosphates below 1000 ppm, preferably below 500 ppm, are tolerable in the antifreeze.

The buffer systems of the present invention are capable of being incorporated in large amounts into the antifreeze concentrate, thereby affording an ability to increase the (i.e. low pH maintaining) buffer capacity or reserve. Buffer capacity is measured in terms of ASTM Reserve Alkalinity (herein "RA"). RA is determined using ASTM-D-1121 whereby a 10 ml. sample of concentrate is diluted to 100 ml. with water and titrated with 0.1N HCL to a pH of 5.5. The volume of acid used in the titration is the RA. Preferably, the concentrates of the present invention have an RA between about 10 and about 75 (more preferably between 30 and 75) measured by the ASTM standard. An RA between 30 and 75 is particularly preferred since exceptional corrosion inhibition on metals has been found within this range.

Pursuant to the present invention, it has been found that the relatively low pH antifreeze concentrates of this invention, when diluted with water, impart highly effective protection against aluminum corrosion in comparison to state-of-the-art antifreezes. This is particularly evident in protection against cavitation-erosion-corrosion, where in use, antifreeze concentrates within this invention, when diluted with water, should provide protection that is significantly superior to that achieved with state-of-the-art antifreezes. This requires maintaining the pH of the concentrate within the range set forth. Thus, below about 5.8, the antifreeze resulting from dilution of the concentrate is generally expected to be unduly corrosive to ferrous metal; whereas, above a concentrate pH of about 7.5, the resulting antifreeze is expected to promote high levels of aluminum corrosion and transport deposits. Concentrates having a pH between about 5.8 and about 7.5, upon dilution with water or a mixture of water and alcohol, generally provide a working antifreeze having a pH of not greater than about 9. A pH at and below this value favors minimized corrosiveness toward amphoteric metals and minimized aluminum transport deposition in the cooling system.

As previously described, the antifreeze concentrates of the present invention are particularly suited for use in cooling systems employing only aluminum metal. However, at present, and as expected in the near future, many cooling systems are what may be termed "hybrid" systems, having, in addition to aluminum, other metal surfaces that must be considered, such as, but not limited to, ferrous surfaces. The antifreeze concentrates of the present invention may be used in such hybrid systems, as well as, indeed, in even a largely ferrous system.

In hybrid and largely ferrous systems, less than optimum corrosion resistance for iron and other non-aluminum metal surfaces is occasionally encountered. It is accordingly preferred to utilize in such systems supplementary corrosion inhibitors for the particular metal surfaces involved. A wide variety of such additives are known and may be employed.

Moreover, irrespective of the metal surfaces in the particular cooling system, such supplementary inhibitors and other optional additives may desirably be included. In any case, these should be employed in a minor amount, up to about 50 weight percent of the antifreeze concentrate.

Typical optional additives include, for example, known corrosion inhibitors for metals such as, for example, molybdates, tungstates and chromates, borates, organophosphates, carbonates and bicarbonates, sebacates and other dicarboxylic acids, benzoates, hydroxy benzoates or acids thereof, silicones, alkali metal nitrates, alkali metal nitrites, tolyltriazole (hereinafter "TTZ"), mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide a measurable extent of corrosion inhibition with respect to the cooling system metal surfaces to be protected.

Other typical optional additives that may be employed include wetting agents and surfactants such as, for example, known ionic and non-ionic surfactants such as the poly(oxyalkylene) adducts of fatty alcohols; antifoams and/or lubricants such as the well-known polysiloxanes and the polyoxyalkylene glycols, as well as any other minor ingredients known in the antifreeze art.

In addition to being characterized by excellent resistance against cavitation-erosion-corrosion, the antifreeze concentrates of the present invention possess adequate storage stability, i.e., are free from gelation for at least six months at 150° F. following manufacture. It will, of course, be preferred to utilize antifreeze concentrates that are essentially free from gelation for at least one year, and, more preferably, at least two years and even longer. Stability of this extent will allow usage in virtually all conventional channels of commerce. However, a stability of at least six months will be acceptable for use in many channels of commerce.

The following Examples are merely illustrative of, and are not intended to limit, the present invention.

EXAMPLE 1

SILICATE GEL STABILITY TESTS WITH AND WITHOUT SILICONE (SILOXANE) STABILIZER

This Example illustrates the gelation problem that can result in the low pH concentrates of the present invention when an organosiloxane/silicate polymer (hereinafter referred to as "silicone") is not employed in accordance with the present invention. The reason for testing the concentrates for stability against silicate gelation is that the concentrates must be able to withstand substantial storage time on the shelf in a jug or other package at ambient temperature during warehousing and retail marketing thereof.

Concentrates A through D in Table I below include Concentrates A and B within the scope of the present invention. Concentrates C and D are controls for comparison, having components identical to those of A and B, respectively, but without silicone.

The stability tests were run by placing each test solution in a two-ounce, "French-square" glass bottle, stored at room temperature or placed in an elevated temperature oven. Each concentrate was tested at about 70° F. (21° C.), 100° F. (38° C.), 130° F. (54° C.), 150° F. (66° C.), and 212° F. (100° C.). As stated above, adequate storage stability is met by a concentrate that is free from gelation for at least six months at 150° F. following manufacture. It is desirable for the concentrate to be free from gelation for six months at the lower test temperatures. The 212° F. stability test data is presented for the sake of completeness.

TABLE I

FORMULATIONS

| | Weight Percent in Concentrate | | | |
|---|---|---|---|---|
| | Concentrate A | Concentrate B | Concentrate C | Concentrate D |
| Component | | | | |
| Ethylene Glycol | 96.050 | 95.682 | 96.150 | 95.782 |
| $Na_2B_4O_7$—$5H_2O$ | 1.962 | 2.706 | 1.962 | 2.706 |
| NaOH (50 wt % aqueous) | 0.905 | 0.529 | 0.905 | 0.529 |
| Sodium Silicate* | 0.366 | 0.366 | 0.366 | 0.366 |
| Sodium Salt of TTZ (50 wt % aqueous) | 0.117 | 0.117 | 0.117 | 0.117 |
| Sodium Nitrate, 40% aq. | 0.500 | 0.500 | 0.500 | 0.500 |
| Silicone** | 0.100 | 0.100 | — | — |
| Physical Properties | | | | |
| pH of Concentrate | 7.2 | 5.9 | 7.2 | 5.9 |
| pH of 50 vol % Concentrate in Water | 8.9 | 7.9 | 8.9 | 7.9 |
| pH of 33 vol % Concentrate in Water | 9.2 | 8.2 | 9.2 | 8.2 |
| ASTM RA | 29.73 | 30.07 | 29.73 | 30.07 |

*Sodium silicate obtained from Diamond Shamrock, Inc. and containing 29.2 wt % $SiO_2$, 9.1 wt % $Na_2O$, the balance being water to make 100 wt % total. The amount of silicate given above is equivalent to 500 ppm Si in each concentrate.
**The silicone employed has an active species identified by the structural formula: $CH_3O(CH_2CH_2O)_mC_3H_6Si(OCH_3)_3$ wherein m has an average value of 7.2.

Employing the above stability tests, no sample of either Concentrate A or Concentrate B gelled after nine months on test. In contrast, Concentrates C and D corresponding to Concentrates A and B, respectively, but without silicone, all gelled within one week at all test temperatures.

The above results show that concentrates containing silicone were stable at pHs of 5.9 and 7.2, whereas concentrates without silicone were not stable and gelled. Hence, by virtue of this invention, stable silicone/silicate containing concentrates can be made at these pHs.

EXAMPLE 2

SILICATE STABILIZING ABILITY OF SILANES IN ANTIFREEZE CONCENTRATES

This Example illustrates the selectivity required for the silanes useful in preparing the siloxane of component (A) of the antifreeze concentrates of this invention.

To samples of Concentrates C and D of Table I above was added 45 ppm of the silanes identified in Table II below. The resulting antifreeze concentrates were tested for storage stability in accordance with the procedure of Example 1 for a time period in excess of twelve months, unless gelling occurred sooner in a particular concentrate.

The results, in terms of time before appearance of gels at any of the specified temperatures, appear in Table II below. It should be noted that, in Table II, the longest test duration is designated as ">12mo" which denotes greater than 12 months of test with no visual appearance of gels.

TABLE II

Stability of Silanes in Antifreeze Concentrate[1]
(Time Before Concentrate Gels)

| Test Temperatures | 70° F. | | 100° F. | | 130° F. | | 150° F. | | 212° F. | |
|---|---|---|---|---|---|---|---|---|---|---|
| Silane Concentrate | C | D | C | D | C | D | C | D | C | D |
| A. $NCC_2H_4Si(OC_2H_5)_3$ | 6 mo | >12 mo | 5 mo | 6-12 mo | 2 mo | 3 mo | 3 wk | 2 mo | 1 wk | 2 wk |
| B. $CH_3O(CH_2CH_2O)_3C_3H_6Si(OCH_3)_3$ | 6 mo | >12 mo | 5 mo | >12 mo | 2 mo | 5 mo | 3 wk | 3 mo | 1 wk | 3 wk |
| C. $CH_3O(CH_2CH_2O)_{7.2}C_3H_6Si(OCH_3)_3$ | 5 mo | >12 mo | 6-12 mo | >12 mo | >12 mo | >12 mo | >12 mo | >12 mo | >12 mo | >12 mo |
| D. $CH_3O(CH_2CH_2O)_{11}C_3H_6Si(OCH_3)_3$ | >12 mo | >12 mo | >12 mo | >12 mo | >12 mo | >12 mo | >12 mo | >12 mo | >12 mo | >12 mo |
| E. $CH_3O(CH_2CH_2O)_{20}C_3H_6Si(OCH_3)_3$ | 5 mo | 6-12 mo | 3 mo | 6-12 mo | >12 mo | >12 mo | >12 mo | >12 mo | >12 mo | >12 mo |
| F. $CH_3O(C_3H_6O)_2(CH_2H_4O)_5C_3H_6Si(OCH_3)_3$ | 5 mo | 6-12 mo | 3 mo | 5 mo | 3 wk | 3 mo | 3 wk | 3 mo | 3 wk | 2 mo |
| G. $(CH_3)(O)(OCH_3)POC_3H_6Si(OCH_3)_3$[2] | >12 mo | >12 mo | >12 mo | >12 mo | >12 mo | >12 mo | >12 mo | >12 mo | >12 mo | >12 mo |
| H. $CH_2CHCH_2OC_3H_6Si(OCH_3)_3$ | 5 mo | 5 mo | 2 mo | 3 mo | 3 wk | 3 mo | 3 wk | 4 mo | 6-12 mo | >12 mo |
| I. $(C_2H_5O)(O)CCH_2CH_2Si(OC_2H_5)_3$ | 5 mo | >12 mo | 3 mo | 5 mo | 3 wk | 3 mo | 6-12 mo | 2 mo | >12 mo | >12 mo |
| J. $NH_2C_3H_6Si(OC_2H_5)_3$ | >12 mo | >12 mo | >12 mo | >12 mo | 6-12 mo | 6-12 mo | 2 mo | 5 mo | 1 wk | 1 wk |
| K. $CH_3Si(OCH_3)_3$ | >12 mo | >12 mo | 5 mo | >12 mo | 3 mo | 5 mo | 3 wk | 3 mo | 1 wk | 2 wk |
| L. $(CH_3O)(O)C(CH_2)_{10}Si(OCH_3)_3$ | 1 wk | 1 wk | 2 wk | 1 wk | 1 wk | 3 d | 1 wk | 1 wk | 1 wk | 2 wk |
| None-control (No Silane) | 5 mo | >12 mo | 3 mo | 6-12 mo | 3 wk | 2 mo | 1 wk | 2 mo | 1 wk | 1 wk |

[1] As used in this table, "d" denotes days, "wk" denotes weeks, and "mo" denotes months.
[2] Saponified to form a silico-phosphonate.

The above results show that silanes C, D and G consistently retard gel formation by stabilizing the respective silicate-containing antifreeze concentrates against gelation. The only exception to greater than one year gel retardation for each of those silanes is found in silane C in concentrate C at room temperature and at 100° F.

Silanes B, C, D and E form a class of ethoxy-containing silanes ranging from an average of three ethoxy groups for silane B to an average 20 ethoxy groups for silane E. In this family of compounds, it is noted that silanes B and E performed unsatisfactorily as compared to silanes C and D. It is theorized that the more favorable performance of silanes C and D is attributable to a more optimum lyophyllicity in stabilizing silicate at the pHs and concentration tested in comparison to that of the other silanes of this family. Thus, it is theorized that silane E, with an ethoxy chain length of 20, appears to have too great a level of lyophyllicity to adequately stabilize the silicate in the antifreeze concentrates tested. Accordingly, when employing ethoxy-containing silanes, an average ethoxy chain length of between about 7 and about 11 is preferred. However, it is expected that by suitable adjustment of each concentrate, such as by increasing the amount of silane B or E and/or by decreasing the amount of silicate, adequate stabilization will result for each of silanes B and E.

It is noted that of the ethoxy-containing silanes tested, silane D with an ethoxy chain length of 11, performed the best in that it stabilized all concentrates tested for more than 12 months. Silane C, with an average ethoxy chain length of 7.2, also performed fairly well in stabilizing silicate, especially in concentrate D and a pH of 5.9. This performance is considered attributable to satisfactory, but less than optimum lyophyllic character of silane C in the particular concentrate.

Silane G, a saponified silicate/phosphonate of a commercially available compound, showed excellent silicate stabilization in both concentrates C and D.

EXAMPLE 3

SILICATE STABILIZING ABILITY OF OTHER SILANES IN ANTIFREEZE CONCENTRATE

This Example illustrates the preparation of the antifreeze concentrate of the present invention utilizing various silanes to form component (A).

Another concentrate of this invention was prepared having ingredients specified in concentrate C of Table I but having a concentrate pH of 7.0 and a ASTM reserve alkalinity of 55. To one sample of the resulting concentrate was added 45 ppm (parts per million) of saponified $CH_3OOC(CH_2)_{10}Si(OCH_3)_3$ in Si equivalents, and to a second sample of the concentrate was added 45 pm of saponified $(CH_3)_2(O)PCH_2CH_2Si(OCH_3)_3$ in Si equivalents.

The saponified $CH_3OOC(CH_2)_{10}Si(OCH_3)_3$ provided excellent silicate stabilization for a six month time period over the entire range of test temperatures as specified in Table II above. The saponified $(CH_3O)_2(O)PCH_2CH_2Si(OCH_3)_3$ provided good silicate stabilization against gelation over all test temperatures except 212° F. where the concentrate gelled after two weeks.

In addition to the above two silanes, Silane C from Table II above was also tested in the 55 reserve alkalinity concentrate of the present example. This provided good silicate stabilization against gelation for at least six months, when tested at 123 ppm of silane in the concentrate.

EXAMPLE 4

SILICATE STABILIZATION AT VARIOUS SI LEVELS

This Example demonstrates the effect upon freedom from gelation with varying amounts of silicate being employed.

Concentrate A of Table I above (containing 500 ppm Si) was duplicated except that the amount of sodium borate pentahydrate used was 1.472 wt. percent and the amount of sodium hydroxide used was 0.657 wt. percent based upon the weight of the concentrate to form a new concentrate (Concentrate E) having an RA of 23 and a pH of the concentrate of 7.2. Samples of Concentrate E were found to be stable at storage temperatures ambient (about 70° F.), 100° F., 130° F., 150° F. and 212° F. for three months without any gel or precipitate formation in the samples.

At higher levels of silicate, however, including 750 ppm (0.075 wt. percent) Si and 1000 ppm Si (0.100 wt. percent), in an otherwise identical formulation, gels were visually observed within three months' storage. The gels were found in both 23 RA and 15 RA samples of such high-silicate concentrates.

Based upon the above results, 750 ppm Si in a concentrate of this invention is considered to be too high to avoid gels at the silicone level used in the compositions of this Example, whereas 500 ppm Si is well-within a gel-free operable range. These results support a silicate level of below about 700 ppm. Si for the silicone/silicate polymers in a preferred embodiment of the present invention.

EXAMPLE 5

GLASSWARE TESTS ON COMMERCIAL ANTIFREEZE AND ANTIFREEZE OF THIS INVENTION

This Example compares the corrosion-inhibiting effectiveness of an antifreeze concentrate of this invention with that of a commercially available antifreeze.

The commercial antifreeze utilized was 1983 production borate/phosphate buffered PRESTONE II containing the silicone identified in footnote ** of Table I and also containing corrosion inhibitors comparable in kind and amount to those of Formulations C and D of Table III below.

Using the ASTM D-1384 glassware test, various metal specimens were immersed in beakers containing the antifreeze sample for 336 hours and metal weight loss of each specimen was determined. The results are presented in Table III which follows.

EXAMPLE 6

ENGINE DYNAMOMETER TEST COMPARING COMMERCIAL ANTIFREEZE WITH ANTIFREEZE OF THIS INVENTION

This Example compares the radiator heat transfer and cooling flow loss characteristics of an antifreeze concentrate of the present invention with those of a commercially available antifreeze.

A sample of Concentrate A from Table I above was diluted with water to a 45 volume percent concentrate in water to make an antifreeze having a pH of about 9.2. As a comparison, a sample of the 1983 production PRESTONE II commercial antifreeze concentrate, as further identified in Example 5 above and containing silicone/silicate in a phosphate-borate buffer, was diluted with water to provide an antifreeze having a pH of about 10.5.

The above two antifreezes were tested on the Ford Engine Dynamometer Test (Ford Specification FLTM BL2-2). The test apparatus consisted of a Ford Escort 1.6 liter OHC four cylinder engine with a cast iron block, aluminum cylinder head and aluminum water pump. Load (61 ft/lb torque) and speed (2400 rpm) were maintained by means of an eddy current dynamometer. Engine cooling was circulated through a standard Ford Escort soldered brass radiator with nylon header tanks. This radiator was located in a tank which was fed by water to control the cooling temperature exiting from the engine's blocked-open thermostat at 225° F. A motorized control valve shunted a portion of the engine cooling through radiator bypass tubing to maintain the required temperature drop across the radiator of 35° F. A third parallel cooling circuit contained a mechanically assembled "Sofica" aluminum heater core. A constant speed blower circulated air across the heater core to effect heat transfer in this portion of the cooling circuit. The test cycle sequence was 16 hours operation and 8 hours off, and the total operating "on" time was 672 hours.

Each antifreeze was tested for loss of radiator heat transfer capability and radiator cooling flow loss. The results are presented in Table IV:

TABLE III
ANTIFREEZE AND GLASSWARE PERFORMANCE DATA

| Formula | Antifreeze Properties | | | | ASTM D-1384 Glassware Test Results mg per 4 square inches | | | | | |
|---|---|---|---|---|---|---|---|---|---|---|
| | pH | | RA$^4$ | | | ASTM | | | Cast | |
| | Initial | Final | Initial | Final | Copper | Solder | Brass | Steel | Fe | A |
| Form C$^{(1)}$ | 9.2 | 9.0 | 30 | 29 | 1 | 8 | 3 | 1 | 0 | 3 |
| | | 9.0 | | 29 | 1 | 7 | 3 | 1 | 1 | 6 |
| | | 9.0 | | 29 | 3 | 4 | 3 | 0 | 0 | 4 |
| | | 9.0 | | 29 | 2 | 4 | 4 | 1 | 0 | 1 |
| Form D$^{(2)}$ | 8.7 | 8.6 | 61 | 60 | 2 | 4 | 5 | 1 | 0 | 2 |
| | | 8.6 | | 59 | 4 | 1 | 4 | 0 | 0 | 2 |
| PRESTONE II$^{(3)}$ | 10.5 | 10.0 | 14 | 13 | 3 | 4 | 4 | 3 | 1 | 4 |
| | | 10.0 | | 13 | 2 | 2 | 3 | 2 | 1 | 6 |

$^{(1)}$33 vol % of Concentrate A in water where Concentrate A is defined in Table I above.
$^{(2)}$Form C above with additional borate added to provide an initial RA of 61.
$^{(3)}$A commercially available phosphate/borate buffered antifreeze product of Union Carbide Corporation, 1983 Production PRESTONE II.
$^{(4)}$ASTM RA based on the concentrates.

The results as presented in Table III demonstrate that antifreezes of the present invention, including both Formulation C and Formulation D, performed at least as well overall as a commercial antifreeze, PRESTONE II, in the ASTM D-1384 glassware test on the metals tested, most notably aluminum and iron.

TABLE IV

| | Radiator Characteristics | |
|---|---|---|
| Composition | Heat Transfer Capacity Loss | Coolant Flow Loss |
| PRESTONE II | 6% | 9% |
| Antifreeze from | 5% | 6% |

TABLE IV-continued

| | Radiator Characteristics | |
|---|---|---|
| Composition | Heat Transfer Capacity Loss | Coolant Flow Loss |
| Concentrate A (diluted) | | |

The results as presented in Table IV demonstrate the superiority of the antifreezes made from Concentrate A over commercial Prestone II antifreeze with regard to minimized aluminum transport deposition in the Ford Engine Dynamometer Test. This is considered to represent an advance in the antifreeze art since PRESTONE II has been generally recognized as providing high resistance to aluminum corrosion and against transport deposition.

While this invention has been described with reference to certain specific embodiments, it will be recognized by those skilled in this art that many variations are possible without departing from the scope and spirit of the invention and that it is intended to cover all changes and modifications of the invention disclosed herein for the purposes of illustration which do not constitute departure from the spirit and scope of the invention.

I claim:

1. An antifreeze composition concentrate comprising of:
   (i) an alcohol,
   (ii) a corrosion inhibiting amount of an organosiloxane/silicate polymer, that is soluble and stable against gelation in the antifreeze composition concentrate, and that contains as its essential components from 0.1 to 99.9 parts by weight of A and from 0.1 to 99.9 parts by weight of B or C, or mixtures of B and C, wherein the individual components of the polymer comprise:
      (A) a lyophyllic, organofunctionally-modified siloxane portion of the polymer and defined as a distribution of species represented by the empirical formula:

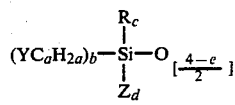

where Y represents a lyophyllic organofunctional moiety selected from a group consisting of polyethyleneoxy containing species, hydroxy containing species, saponified carboxy containing species, saponified phosphate or phosphonate ester containing species, saponified sulfonate containing species, or mixtures thereof; wherein a is an integer having a value of 1 to 20 inclusive, b is an integer having a value of 1 to 3 inclusive, c is an integer having a value from 0 to 2 inclusive, d is an integer having a value from 0 to 3 inclusive and e is an integer having a value from 1 to 4 inclusive, the value for e being equal to the sum of b, c and d; R is a monovalent hydrocarbon radical free of olefinic unsaturation; and, Z represents a hydrolyzable moiety attached to silicon consisting of at least one member selected from a group consisting of OR' and NR'$_2$ wherein R' is selected from the group consisting of hydrogen, monovalent hydrocarbon radicals, and substituted monovalent hydrocarbon radicals; said siloxane portion being present in an amount sufficient to solubilize and stabilize against gel formation said orgnosiloxane/silicate polymer,
      (B) an inorganic silicate described as a distribution of species represented by the empirical formula:

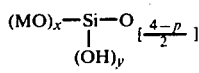

wherein M is a monovalent cation that forms a water soluble silicate, selected from the group consisting of sodium, potassium, lithium, rubidium and tetraorganoammonium cations and where x has a value of from 1 to 4 inclusive, y has a value from 0 to 3 inclusive and p has a value from 1 to 4 inclusive which is equal to the sum of x and y; and
      (C) an organic silicate ester encompassed by the formula:

wherein R is selected from the group consisting of alkyl, aryl, alkoxyalkyl, alkoxyaryl and mixtures thereof, and
   (iii) a buffer selected from the group consisting of ammonium borate, alkanolamine and alkali metal borate, alkaline earth metal borates, tetraalkyl and tetraaryl-ammonium borates and, mixtures of the above borates and ammonium phosphate, alkanolamine phosphates and tetraalkyl and tetraaryl-ammonium phosphates, and phosphate mixtures thereof, ammonium and amine benzoates and substituted benzoates, and ammonium and amine salts of dibasic acids having 6 to 20 carbons, said buffer being present in an amount of between about 1 and about 5 wt. percent, based on the weight of the concentrate, and yielding a reserve alkalinity from about 10 to 75; said concentrate having a pH range in the concentrate of 5.8 to about 7.5, with the proviso that essentially no alkali metal phosphate is present.

2. The concentrate of claim 1 wherein said organosiloxane/silicate polymer additionally contains up to about 50 parts by weight of a lyophobic, organofunctionally-modified siloxane portion described by the empirical formula:

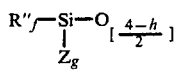

where R" is a monovalent hydrocarbon radical, Z has the meaning defined in claim 1, f is an integer having a value from 1 to 3 inclusive, g has a value from 0 to 4 inclusive, h has a value from 1 to 4 inclusive which is equal to the sum of f and g.

3. The concentrate of claim 1 wherein said organosiloxane/silicate polymer additionally contains a lyophobic organofunctionally-modified siloxane portion described as a distribution of species represented by the empirical formula:

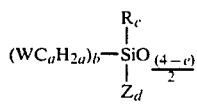

where W represents an organofunctional moiety selected from a group consisting of acyl containing species, acyloxy containing species, acyloxyalkyleneoxy containing species, alkylamino containing species, arylamino containing species, alkylarylamino containing species, alkoxyalkyleneoxy containing species, alkyldialkoxysilyl containing species, amino containing species, aminoalkyleneamino containing species, aminopolyalkyleneamino containing species, aryloxy containing species, aryloxyalkoxy containing species, carboalkoxy containing species, cyano containing species, cyanoalkoxy containing species, cyanoalkoxy alkyleneoxy containing species, cycloalkylene amino containing species, dialkanolamino containing species, dialkoxy alkylsilyl containing species, dialkyl alkoxysilyl containing species, dialkylamino containing species, dioxalano containing species, epoxy alkoxy containing species, epoxy allyl containing species, epoxy cycloalkoxy containing species, epoxycycloallyl containing species, furfuryloxy containing species halogen containing species, imidazolino containing species, imino containing species, unsaponified organophosphate ester containing species, pyridino containing species, tetrahydrofurfuryloxy containing species, trialkoxymethyl containing species, trialkoxymethyl containing species, trialkoxysilyl containing species, trialkylsiyl containing species, trialkanolammonium containing species, trialkylammonium containing species, the free acid or unsaponified carbalkoxyalkylamino containing species, and the free acid or unsaponified carboalkoxyalkylsulfonate; a is an integer having a value of 1 to 20 inclusive, b is an integer having a value of 1 to 3 inclusive, c is an integer having a value of from 0 to 2, d is an integer having a value from 0 to 3 and e is an integer having a value from 1 to 4 inclusive, the value of e being equal to the sum of b, c and d; R is a monovalent hydrocarbon value free of olefinic unsaturation and Z has the meaning defined in claim 1.

4. The concentrate of claim 1, wherein the pH is between 5.9 and 7.2.

5. The concentrate of claim 1 wherein the reserve alkalinity is between 30 and 75.

6. The concentrate of claim 1 wherein said siloxane portion (A) of said organosiloxane/silicate polymer is:

CH$_3$O(CH$_2$CH$_2$O)$_7$C$_3$H$_6$Si(OCH$_3$)$_3$.

7. The concentrate of claim 1 wherein said siloxane portion (A) of said organosiloxane/silicate polymer is:

CH$_3$O(CH$_2$CH$_2$O)$_{11}$C$_3$H$_6$Si(OCH$_3$)$_3$.

8. The concentrate of claim 1 wherein said siloxane portion (A) of said organosiloxane/silicate polymer is:

saponified (CH$_3$)(O)(OCH$_3$)POC$_3$H$_6$Si(OCH$_3$)$_3$.

9. The concentrate of claim 1 wherein said siloxane portion (A) of said organosiloxane/silicate polymer is:

saponified CH$_3$OOC(CH$_2$)$_{10}$Si(OCH$_3$)$_3$.

10. The concentrate of claim 1 wherein said siloxane portion (A) of said organosiloxane/silicate polymer is:

saponified (CH$_3$O)$_2$(O)PCH$_2$CH$_2$Si(OCH$_3$)$_3$.

11. The concentrate of claim 1 wherein said siloxane portion (A) of said organosiloxane/silicate polymer has a Y group consisting of polyethyleneoxy containing species having an average ethoxy chain length of between about 7 and about 11 ethoxy groups per molecule.

12. The concentrate of claim 2 wherein said lyophobic organofunctionally-modified siloxane is present in an amount of less than 10 mol. percent based on the total amount of organosiloxane/silicate polymer in said concentrate.

13. The concentrate of claim 1 wherein components (B) and (C) are present in an amount of less than about 700 ppm Si in the concentrate.

14. The concentrate of claim 1 wherein said alcohol is ethylene glycol, said buffer is borate or a mixture of borates, said pH is between 5.9 and 7.2, and wherein said concentrate has a reserve alkalinity of between 30 and 75.

15. A method of cooling an internal combustion engine with the concentrate of any of claims 1 through 14 which comprises, without regard to sequence, the steps of:
 (a) diluting the concentrate with water and/or alcohol to produce a working antifreeze, and
 (b) adding the working antifreeze to an automobile engine cooling system.

16. An antifreeze composition comprising the concentrate of any of claims 1 through 14 and additionally containing water or alcohol, or a mixture of water and alcohol.

17. The concentrate of claim 1 wherein component (A) is present in a range equivalent to from about 20 to about 150 ppm of Si, based upon the total weight of said concentrate.

18. The concentrate of claim 17 wherein component (A) is present in a range equivalent to from about 40 to about 130 ppm of Si.

19. The concentrate of claim 1 wherein said organosiloxane/silicate polymer is present in an amount of from about 0.01% to about 10%, based upon the weight of said concentrate.

20. The concentrate of claim 19 wherein said organosiloxane/silicate polymer is present in an amount of from about 0.05% to about 5%.

21. The concentrate of claim 19 wherein said organosiloxane/silicate polymer is present in an amount of from about 0.05% to about 3%.

* * * * *

UNITED STATES PATENT AND TRADEMARK OFFICE
CERTIFICATE OF CORRECTION

PATENT NO. : 4,676,919

DATED : June 30, 1987

INVENTOR(S) : EUGENE ANTHONY ZEINTEK

It is certified that error appears in the above-identified patent and that said Letters Patent is hereby corrected as shown below:

Column 6, line 1: After first occurence of "trialkoxymethyl containing species", delete the second occurrence of "trialkoxymethyl containing species".

Column 16, line 41: Following "45", delete "pm" and replace with "ppm".

Column 17, Table III: Under sub-heading "Cast", following "Fe", delete "A" and replace with "A'".

Column 21, line 32: After first occurrence of "trialkoxymethyl containing species", delete the second occurrence of "trialkoxymethyl containing species".

Signed and Sealed this

Twenty-fourth Day of April, 1990

Attest:

HARRY F. MANBECK, JR.

*Attesting Officer*   *Commissioner of Patents and Trademarks*